US010956739B2

(12) United States Patent
Thomasson et al.

(10) Patent No.: US 10,956,739 B2
(45) Date of Patent: Mar. 23, 2021

(54) AUGMENTED REALITY ROBOTIC SYSTEM VISUALIZATION

(71) Applicant: Autodesk, Inc., San Rafael, CA (US)

(72) Inventors: David Thomasson, San Rafael, CA (US); Evan Patrick Atherton, Foster City, CA (US); Maurice Ugo Conti, Muir Beach, CA (US); Heather Kerrick, Oakland, CA (US)

(73) Assignee: AUTODESK, INC., San Rafael, CA (US)

( * ) Notice: Subject to any disclaimer, the term of this patent is extended or adjusted under 35 U.S.C. 154(b) by 14 days.

(21) Appl. No.: 15/194,342

(22) Filed: Jun. 27, 2016

(65) Prior Publication Data

US 2017/0372139 A1 Dec. 28, 2017

(51) Int. Cl.
| | |
|---|---|
| G06K 9/00 | (2006.01) |
| B25J 9/16 | (2006.01) |
| G02B 27/01 | (2006.01) |
| G06T 19/00 | (2011.01) |
| H04N 7/18 | (2006.01) |

(52) U.S. Cl.
CPC ........ *G06K 9/00671* (2013.01); *B25J 9/1664* (2013.01); *B25J 9/1671* (2013.01); *G02B 27/017* (2013.01); *G06T 19/006* (2013.01); *H04N 7/183* (2013.01); *G05B 2219/39451* (2013.01); *Y10S 901/30* (2013.01); *Y10S 901/47* (2013.01)

(58) Field of Classification Search
CPC ... G06K 9/00671; B25J 9/1671; B25J 9/1664; G02B 27/017; H04N 7/183; G06T 19/006; Y10S 901/30; Y10S 901/47; G05B 2219/39451
See application file for complete search history.

(56) References Cited

U.S. PATENT DOCUMENTS

| | | | | |
|---|---|---|---|---|
| 9,304,003 | B1 * | 4/2016 | Ashman | ............... G01C 21/206 |
| 9,919,427 | B1 * | 3/2018 | Guilbert | ................ B25J 9/1664 |
| 2005/0149231 | A1 | 7/2005 | Pretlove et al. | |
| 2005/0251290 | A1 | 11/2005 | Skourup et al. | |
| 2009/0326713 | A1 | 12/2009 | Moriya | |
| 2014/0039677 | A1 * | 2/2014 | Moore | ................. H04N 9/3179 |
| | | | | 700/258 |
| 2015/0022447 | A1 * | 1/2015 | Hare | ....................... G06F 3/017 |
| | | | | 345/158 |
| 2016/0016315 | A1 | 1/2016 | Kuffner, Jr. et al. | |
| 2016/0055677 | A1 * | 2/2016 | Kuffner | ................. G06T 19/006 |
| | | | | 345/633 |
| 2016/0207198 | A1 * | 7/2016 | Willfor | .............. G05B 19/4061 |

FOREIGN PATENT DOCUMENTS

JP  2009-291540 A  12/2009

OTHER PUBLICATIONS

International Search Report and Written Opinion for International Application No. PCT/US2017/036950 dated Nov. 30, 2017, 19 pages.

* cited by examiner

*Primary Examiner* — Tat C Chio
(74) *Attorney, Agent, or Firm* — Artegis Law Group, LLP (57) ABSTRACT

A technique for displaying a representative path associated with a robotic device. The technique includes detecting at least one reference point within a first image of a workspace, generating the representative path based on path instructions associated with the robotic device and the at least one reference point, and displaying the representative path within the workspace.

21 Claims, 8 Drawing Sheets

AUGMENTED REALITY ROBOTIC SYSTEM VISUALIZATION

BACKGROUND

Field of the Embodiments

The various embodiments relate generally to human-machine interfaces and, more specifically, to augmented reality robotic system visualization.

Description of the Related Art

Recent advances in the fields of robotics and computer-aided manufacturing (CAM) have enabled robotic devices to perform complex tasks traditionally performed by humans. In particular, improvements in the dexterity and sensing capabilities of robotic devices have enabled these types of devices to be adapted to perform a variety of tasks, often in a manner more efficient than their human counterparts. As a result, robotic devices are becoming an important component in many industries.

Increasingly, tasks performed by robotic devices are performed in tandem with humans and/or with other robotic devices. Because these types of tasks often require a robotic device to be in close proximity with humans and/or other robotic devices, robot-human collisions and/or robot-robot collisions are a significant risk factor. While the latter type of collisions may be costly and require significant repairs to one or both of the robots involved in the collision, the former type of collisions may result in great bodily harm or human death. Due to the extreme nature of these risks, many industries are reluctant to integrate robotic devices into applicable operations and processes.

In order to reduce the risk of collisions, conventional software applications (e.g., a CAM software application) allow a user to preview the expected movements of a robotic device associated with a particular operation on a computer screen. The user is then able to modify various aspects of the operation in order to change the path of the robotic device to suit the specific requirements of the user.

One drawback of the above approach is that the preview generated by the software application typically does not take into account other robotic devices, humans, machinery, etc. that may be present in the work environment. Thus, when the user views the preview on his or her computer screen, he or she must then attempt to mentally visualize the movements and potential interactions between the robot being modeled in the application software and other robotic devices, humans, machinery, etc. in the actual work environment as the robot being modeled executes tasks in that work environment. Because such mental visualizations are incredibly difficult, this conventional process is highly error prone and inefficient. Consequently, users oftentimes program robotic devices in an overly cautious and non-optimized manner to avoid all risk of collision, or users end up making mistakes that result in collisions during operation.

Further, because of safety concerns and regulations, if a user believes that an operation may cause a robotic device to collide with an object during operation, then the user typically has to reprogram one or more aspects of the modeled behavior of the robotic device. Such an approach can become quite iterative, tedious, and time consuming, which can result in further reluctance to integrate robotic devices into applicable operations and processes.

As the foregoing illustrates, improved techniques for visualizing and modifying an operation to be performed by a robotic device would be useful.

SUMMARY

Embodiments of the present disclosure set forth a method for displaying a representative path associated with a robotic device. The method includes detecting at least one reference point within a first image of a workspace, generating the representative path based on path instructions associated with the robotic device and the at least one reference point, and displaying the representative path within the workspace.

Further embodiments provide, among other things, a non-transitory computer-readable storage medium and a system configured to implement the techniques set forth above.

At least one advantage of the techniques described herein is that a three-dimensional representation of the path of a robotic device can be viewed within the operating environment of the robotic device, allowing potential collisions to be detected, before such collisions take place. Additionally, the path of the robotic device can be modified via user input within the operating environment itself, and updates to the path can be immediately viewed, for example, via an augmented reality display. Accordingly, robotic devices can be more safely and efficiently implemented in a variety of processes. Further, detailed information about robot components (e.g., joint angles) can be viewed, enabling a user to make more informed decisions when planning complicated movements of a robot.

BRIEF DESCRIPTION OF THE SEVERAL VIEWS OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

DETAILED DESCRIPTION

In the following description, numerous specific details are set forth to provide a more thorough understanding of the embodiments of the present disclosure. However, it will be apparent to one of skill in the art that the embodiments of the present disclosure may be practiced without one or more of these specific details.

Figure 1:
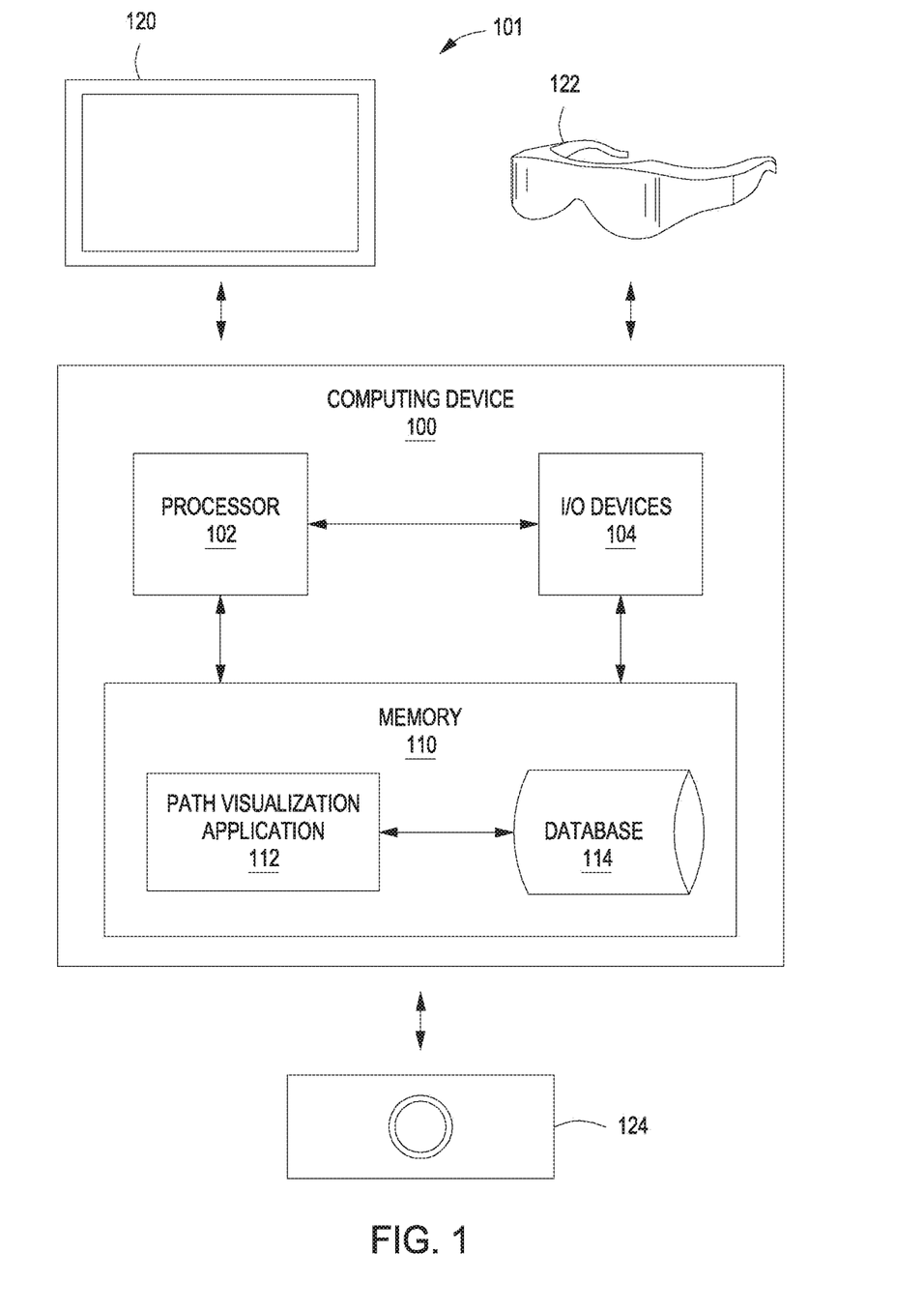
FIG. 1 is a conceptual illustration of a computing device configured to implement one or more aspects of the present invention.

FIG. 1 is a conceptual illustration of a computing device 100 configured to implement one or more aspects of the present invention. As shown, computing device 100 includes, without limitation, a processor 102, input/output (I/O) devices 104, and a memory 110. Memory 110 includes a path visualization application 112 configured to interact with a database 114. In various embodiments, the computing device 100 may be coupled to a display device 120, a head-mounted display device 122, and/or a sensor 124.

The processor 102 may be any technically feasible form of processing device configured to process data and execute program code. The processor 102 could be, for example, and without limitation, a central processing unit (CPU), a graphics processing unit (GPU), an application-specific integrated circuit (ASIC), a digital signal processor (DSP), a field-programmable gate array (FPGA), and so forth.

Memory 110 may include a memory module or a collection of memory modules. Database 114 within memory 110 may store images, video, algorithms, graphical representations, rendering engines, tracking software, path instructions, lookup tables, and/or other types of data associated with tracking reference points, generating graphical representations, displaying graphical representations, etc. The path visualization application 112 within memory 110 is executed by the processor 102 to implement the overall functionality of the path visualization system 101. For example, and without limitation, multimedia content (e.g., images, video, etc.) received via the path visualization system 101 could be processed by the path visualization application 112 to detect and track one or more reference points within a particular environment and generate a representation of the path of a robotic device based on the reference point(s). The path visualization system 101 could then display the representation of the path of the robotic device to a user, such as by overlaying the representation onto real-time images (e.g., images acquired and displayed with typical capture and display latency) of the environment acquired via a sensor 124 and displayed via a display device 120 (e.g., a tablet computer). Additionally, in some embodiments, the path visualization system 101 could display the representation of the path of the robotic device to the user by overlaying the representation onto the field of view of the user via a head-mounted display device 122 (e.g., a transparent augmented reality display).

I/O devices 104 may include input devices, output devices, and devices capable of both receiving input and providing output. For example, and without limitation, I/O devices 104 could include wired and/or wireless communication devices that send data to and/or receive data from a sensor 124 (e.g., a camera, depth sensor, radar sensor, etc.), a display screen (e.g., display device 120, head-mounted display device 122, eta), a storage device, a networking device, and/or another computing device.

The display device 120 and the head-mounted display device 122 may include any technically feasible device for displaying images of an environment and/or graphical representations of a robotic device, a path of a robotic device, information associated with a robotic device, etc. In some embodiments, the display device 120 is included in a mobile computing device, such as a tablet computer. In addition, the head-mounted display device 122 may be included in a mobile computing device, such as a virtual reality headset (e.g., Oculus Rift®) and/or an augmented reality headset (e.g., Microsoft® HoloLens®).

The sensor(s) 124 may include, without limitation, visible light sensors, thermal imaging sensors, laser based devices, ultrasonic sensors, infrared sensors, radar sensors, depth sensors, global positioning system (GPS) devices, magnetometers, inertial sensors, gyroscopes, accelerometers, etc. The sensor(s) 124 enable reference points (e.g., visual features, physical features, GPS coordinates, etc.) within the environment to be tracked and/or images of the environment to be acquired. Although only one sensor 124 is illustrated in FIG. 1, in various embodiments, multiple sensors 124 may be implemented to track references points, acquire images, etc.

Generally, computing device 100 is configured to coordinate the overall operation of the path visualization system 101. In other embodiments, the computing device 100 may be coupled to, but separate from other components of the path visualization system 101. However, the embodiments disclosed herein contemplate any technically feasible system configured to implement the functionality of the path visualization system 101.

Computing device 100 as a whole may be a microprocessor, an application-specific integrated circuit (ASIC), a system-on-a-chip (SoC), a desktop computing device, a mobile computing device such as a tablet computer or cell phone, a media player, and so forth. In some embodiments, computing device 100 is integrated with the display device 120, head-mounted display device 122, and/or sensor 124. In other embodiments, the computing device 100 may be coupled to, but separate from the display device 120, head-mounted display device 122, and/or sensor 124. In such embodiments, the display device 120, head-mounted display device 122, and/or sensor 124 may include separate processors that receive data (e.g., images, instructions, etc.) from and transmit data to the computing device 100. However, the embodiments disclosed herein contemplate any technically feasible system configured to implement the functionality of the path visualization system 101.

Figure 2:
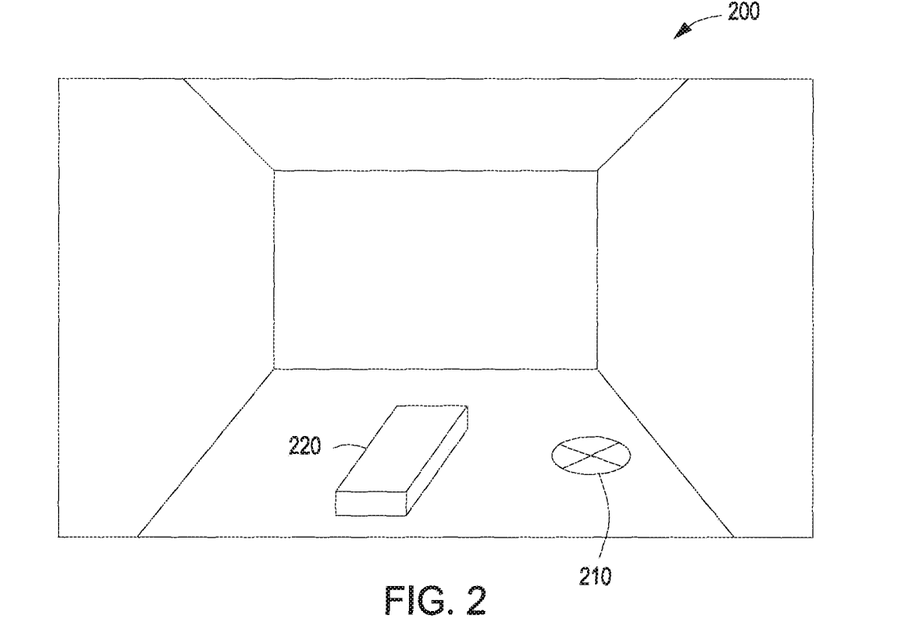
FIG. 2 illustrates a perspective view of a tracker and a workpiece included in a work environment, according to various embodiments of the present invention.

FIG. 2 illustrates a perspective view 200 of a tracker 210 and a workpiece 220 included in a work environment, according to various embodiments of the present invention. In various embodiments, the perspective view 200 represents an image of an environment in which a graphical representation of a robotic device, a robotic device path, and/or other data related to the robot is to be displayed, such as by overlaying the graphical representation(s) onto the image. In some embodiments, the perspective view 200 represents a field of view of a user in which a graphical representation is to be displayed, such as by displaying the graphical representation via a transparent display positioned in front of one or both eyes or the user.

As shown, a tracker 210 may be positioned within a particular environment to indicate the location at which a graphical representation is to be displayed. In general, the tracker 210 may include any identifiable shape, color, pattern, etc. that is capable of being recognized by via the sensor(s) 124. In various embodiments, the tracker 210 may include a distinct shape and/or pattern that enables the path visualization application 112 to determine the location, orientation, and/or size of the tracker 210 within the perspective view. In such embodiments, the path visualization application 112 is then able to translate, rotate, and/or scale the graphical representation in order to properly display the graphical representation within the perspective view.

Further, in some embodiments, instead of or in addition to using a tracker 210, the path visualization application 112 may detect other types of reference points within an environment in order to translate, rotate, and/or scale the graphical representation so that the graphical representation is properly displayed within the perspective view. For example, the path visualization application 112 could detect one or more edges and/or corners of the environment and/or one or more features of static objects within the environment and use these reference points to track changes to the perspective view 200 caused by moving the sensor(s) 124, moving a display device 120, 122, etc. In a specific example, the path visualization application 112 could detect the location of a robotic device associated with the graphical representation to be displayed and track changes to the perspective view based on changes to the location, orientation, and/or size of the robotic device.

Figure 3:
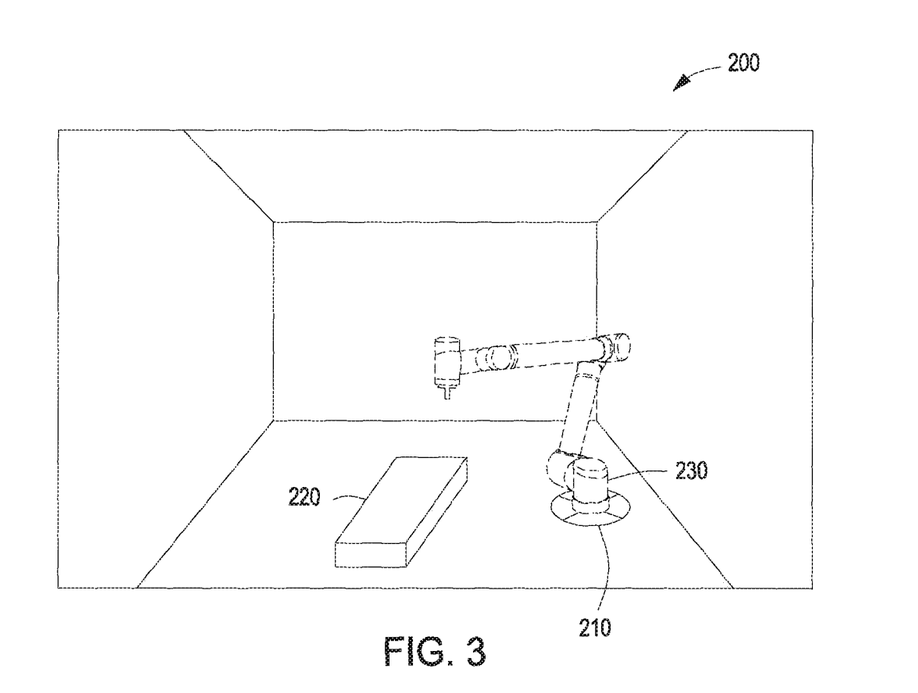
FIG. 3 illustrates a virtual robotic device displayed within the work environment FIG. 2, according to various embodiments of the present invention.

FIG. 3 illustrates a graphical representation of a robotic device 230 displayed within the work environment of FIG. 2, according to various embodiments of the present invention. As shown, the path visualization application 112 generates and displays the graphical representation of the robotic device 230 based on the one or more reference points (e.g., tracker 210), such as by translating, rotating, and/or scaling the graphical representation based on the reference point(s). For example, the path visualization application 112 could generate a graphical representation of the robotic device 230 having the correct orientation and size for the perspective view and display the graphical representation of the robotic device 230 at a location proximate to the reference point(s).

Further, as described above, if the robotic device associated with the graphical representation 230 is physically present in the environment, then the path visualization application 112 may track one or more aspects of robotic device itself in order to properly generate and display the graphical representation 230. For example, the path visualization application 112 could display the graphical representation of the robotic device 230 within the perspective view 200 at substantially the same location as the physical robotic device, enabling the path visualization techniques described below to be performed with respect to the actual location of the physical robotic device.

The path visualization application 112 may cause the graphical representation of the robotic device 230 to be displayed as an opaque graphic, blocking content located behind the graphical representation 230 from being viewed by the user, or as a translucent graphic, causing content located behind the graphical representation 230 to be at least partially visible. In some embodiments, the path visualization application 112 may generate a translucent graphical representation of the robotic device 230 when the graphical representation 230 is being displayed on top of (or proximate to) the physical robotic device so that the graphical representation 230 appears as a "ghosted" version of the physical robot device.

Figure 4A:
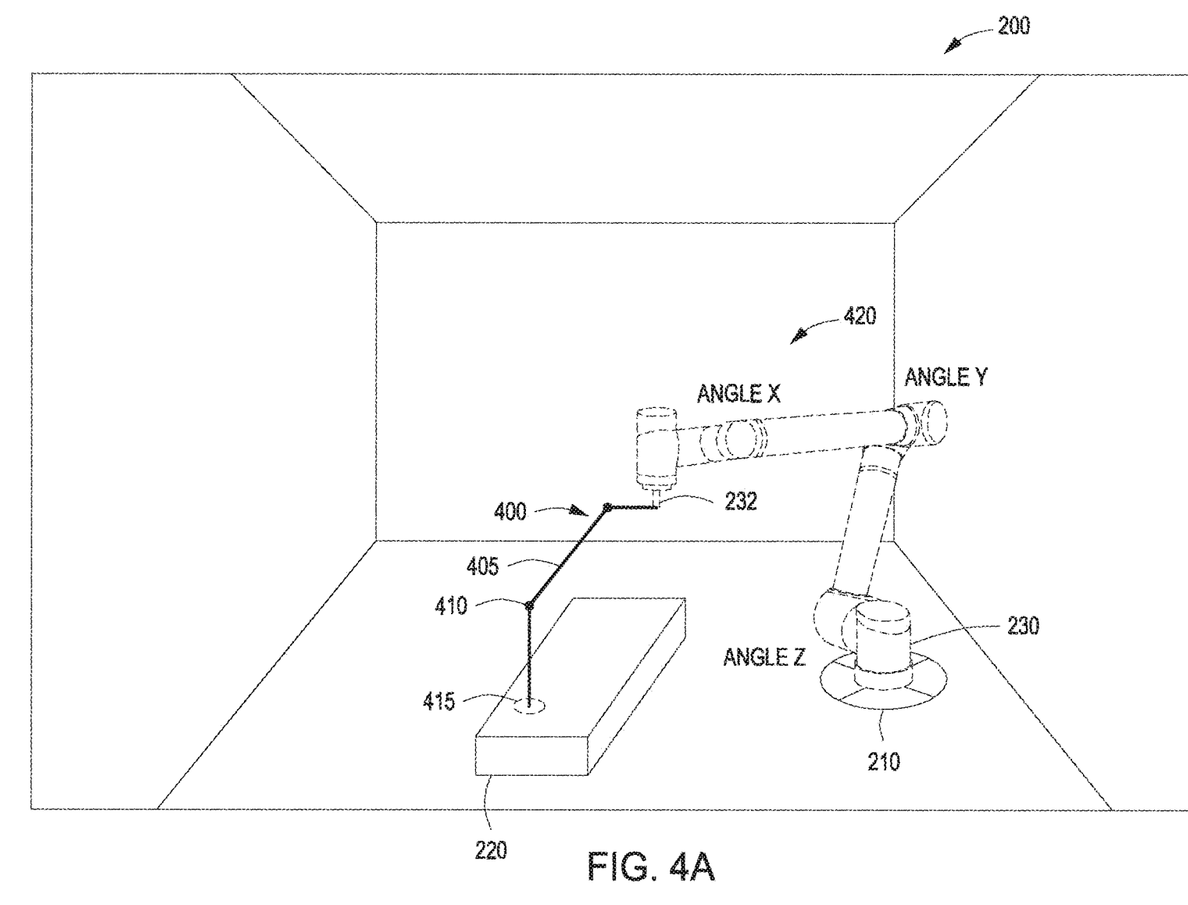
FIGS. 4A-4C illustrate a path visualization technique implemented for the graphical representation of the robotic device of FIG. 3, according to various embodiments of the present invention.
Figure 4B:
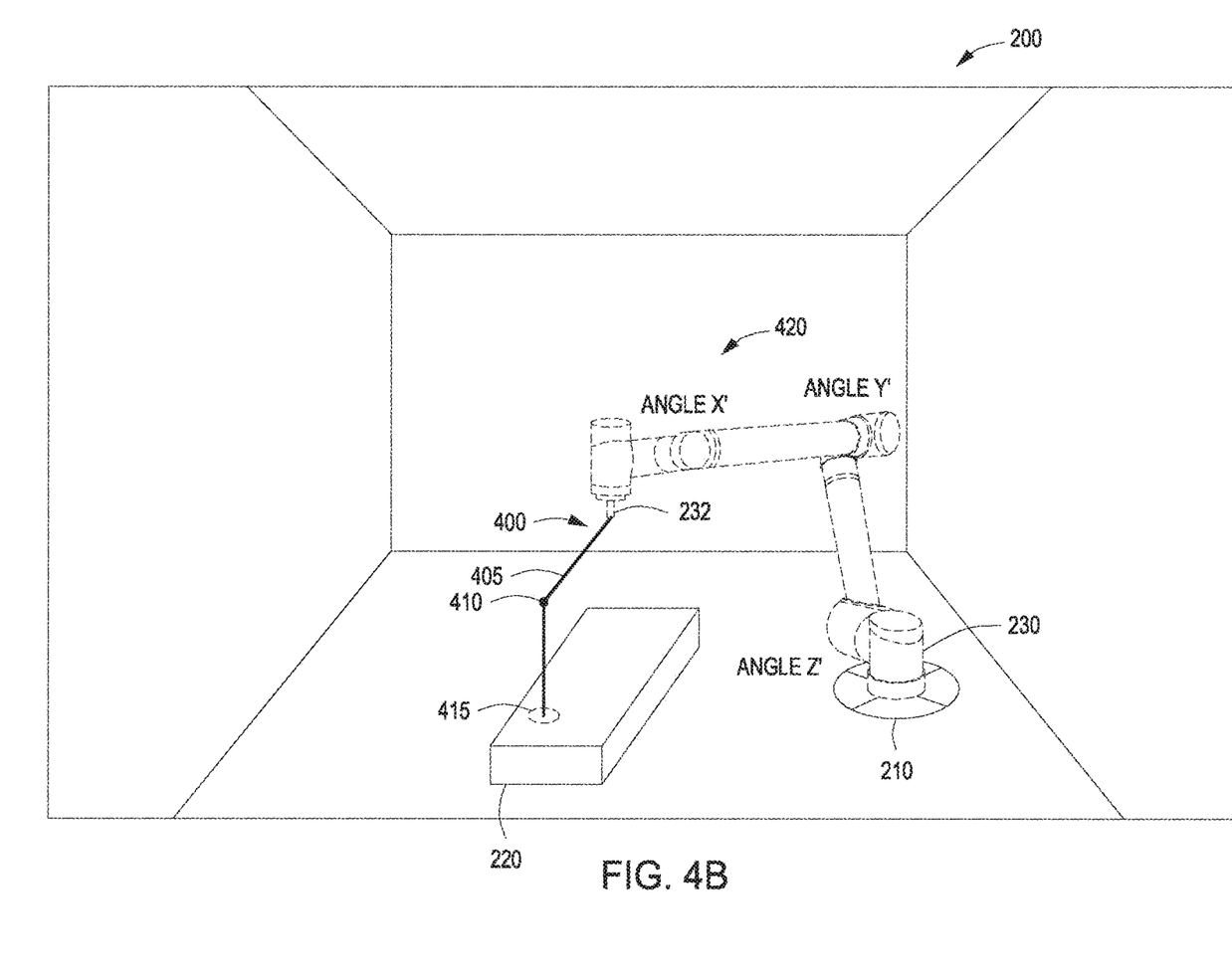
Figure 4C:
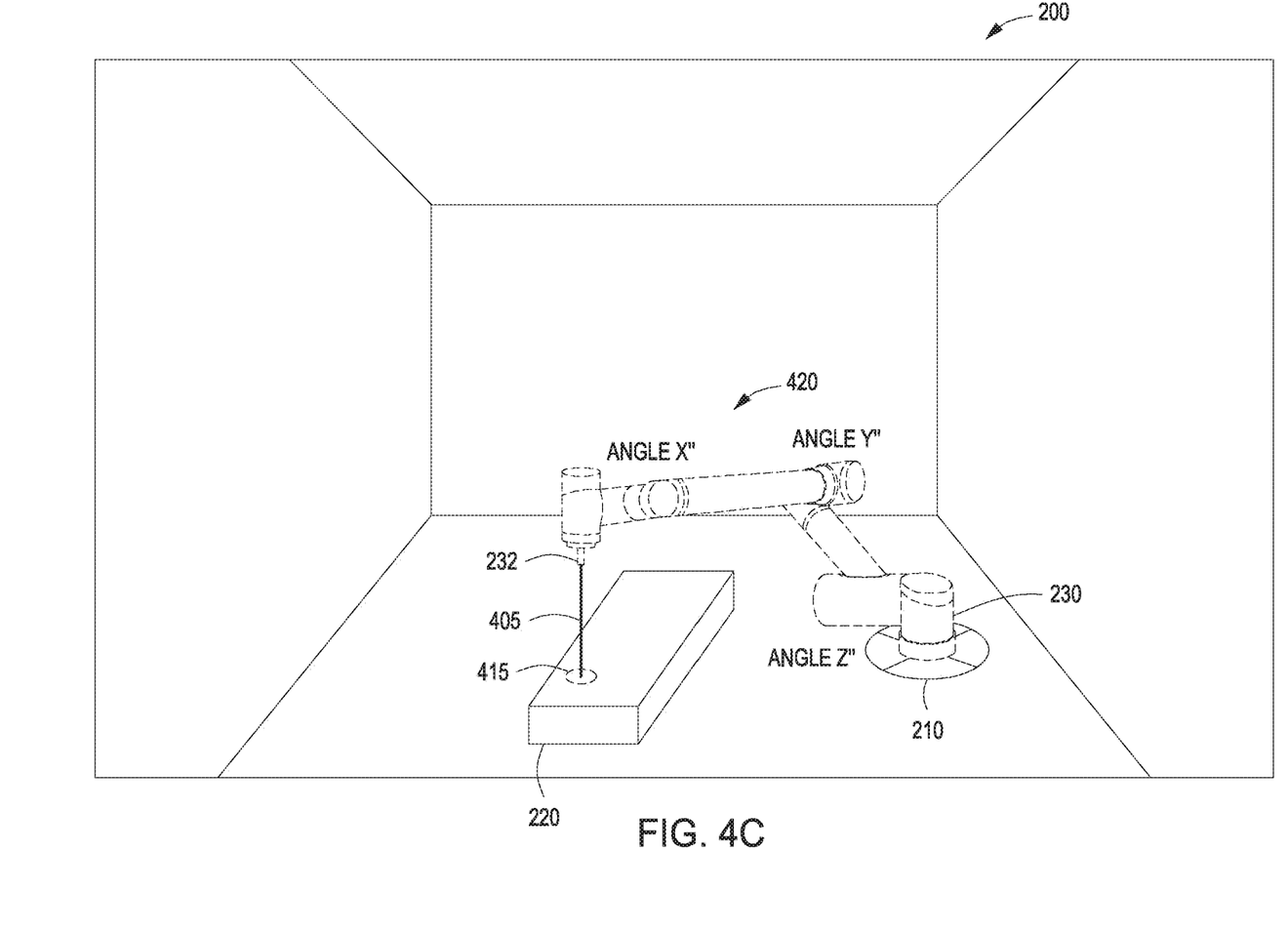

For clarity of illustration and explanation, only one graphical representation of a robotic device 230 is shown in FIGS. 3-4C. However, in various embodiments, the path visualization application 112 may display multiple graphical representations, each corresponding to a different robotic device. Additionally, the graphical representation(s) may be displayed proximate to one or more physical robotic devices and/or humans, enabling a user to view how the robotic devices would be positioned in a work environment while performing one or more tasks. For example, in some embodiments, the path visualization application 112 could simultaneously generate and display two or more graphical representations of different robotic devices that are traversing different paths that may or may not intersect. In such embodiments, the user is able to view how the robotic devices would interact when performing task(s), such as whether the robotic devices are likely to collide, whether the robotic devices are properly working in unison to perform a shared task (e.g., passing objects between one another), and/or whether the robot devices are likely to move proximate to a human or collide with other objects in the environment.

FIGS. 4A-4C illustrate a path visualization technique implemented for the graphical representation of the robotic device 230 of FIG. 3, according to various embodiments of the present invention. As described above, the path visualization system 101 enables a user to visualize a path associated with an operation to be performed by the robotic device. In some embodiments, path visualization includes displaying an animated graphical representation of the robotic device 230, an expected path of one or more components of a robotic device (e.g., an end effector), a trail of a path traversed by a component of a robotic device or a graphical representation of a robotic device 230, and/or various types of information associated with components of a robotic device. For example, during path visualization, the path visualization application 112 could process path instructions (e.g., numerical control (NC) instructions, such as G-code instructions) associated with an operation to be performed by a robotic device to generate a graphical representation of a path 400. The path visualization application 112 could then display the graphical representation of a path 400 via the display device 120 or the head-mounted display device 122.

The graphical representation of the path 400 generated by the path visualization application 112 may include path segments 405 to be traversed by one or more robotic device components (e.g., path segments specified by path instructions). For example, the graphical representation of the path 400 for a particular operation to be performed by a robotic device could extend from a starting point of an end effector 232 of the robotic device to one or more locations 415 at which the end effector 232 would contact one or more workpieces 220.

The graphical representation of the path 400 generated by the path visualization application 112 may further include control points 410 associated with one or more of the path segments 405. For example, as shown, a control point 405 may be positioned proximate to the end(s) of path segments 405 to indicate distinct movements to be performed by a robotic device. Additionally, as described in further detail in conjunction with FIGS. 6 and 7, one or more control points 410 may be interactive, enabling a user to select and move controls points 410 with his or her hand(s) in order to modify the path to be traversed by the robotic device.

In some embodiments, the graphical representation of the path 400 includes an area or a volume that will be occupied by the robotic device while performing a particular operation specified by a set of path instructions. In such embodiments, the user is able to simultaneously view all of the locations that will be occupied by the robotic device for a given time slice when performing the operation. For example, the path visualization application 112 could generate and display shaded volumetric boundaries that represent all of the locations of an operating environment through which a component of the robotic device will travel during an operation. The user would then be able to walk around the environment and determine whether any boundary of the shaded volumetric boundaries intersects an object in the environment and/or a location at which an object may be present during the operation of the robotic device. In another example, the path visualization application 112 could generate and display volumetric boundary indicators that represent all of the locations of an operating environment through which a component of the robotic device will travel during an operation.

For clarity of illustration, the path segments 405 shown in FIGS. 4A-4C are illustrated as straight lines. However, in various embodiments, one or more robotic device components may travel in non-linear paths when performing a particular operation. Accordingly, the graphical representation of a path 400 may include any type of path segment, including straight lines, curves, splines, continuous path segments, non-continuous path segments, etc. For example, when the graphical representation of the path 400 includes curves, splines, etc., the path visualization application 112 may also display control points 410 that define the curvatures of path segments 405 included in the graphical representation of the path 400.

In some embodiments, the path visualization application 112 may further generate and display one or more graphical indicators 420 that represent various types of information associated with components of the robotic device. For example, as shown in FIG. 4A, a graphical indicator 420 may be displayed proximate to one or more joints of the graphical representation of the robotic device 230 to indicate the angles of the joints (e.g., angle X°, angle Y°, angle Z°) as the robotic device performs an operation. In the same or other embodiments, other types of information may be displayed proximate to one or more components of the robotic device, such as the speed of a particular component, the acceleration of a particular component, and/or the distance of a particular component from another object or location. For example, the path visualization application 112 could generate a graphical indicator 420 that displays the speed and/or acceleration of the end effector 232 and/or one or more joints of the robotic device when performing an operation. In some embodiments, the path visualization application 112 could dynamically update the information included in the graphical indicators 420 as the visualization of the operation progresses. In addition, the path visualization application 112 could dynamically update the positions at which the graphical indicators 420 are displayed in the perspective view so that the graphical indicators 420 remain proximate to the corresponding components of the robotic device.

In some embodiments, the graphical indicators 420 include a joint limit meter that indicates how close each joint is to its physical limit. By providing this type of information to a user, the user can make more informed decisions during a path-planning process. For example, if a user notices that a joint is approaching its physical limit—which could prevent the robot from moving in a certain manner later in the process—then the user could change the path and/or configuration of the robot to avoid such issues downstream.

As shown in FIGS. 4B and 4C, as the visualization of an operation progresses, the path visualization application 112 may animate the graphical representation of the robotic device 230, enabling the user to visualize how and where the robotic device would move during the operation. In some embodiments, as a component of the graphical representation of the robotic device 230 moves along the graphical representation of a path 400, portions (e.g., path segments 405) of the graphical representation of the path 400 that have already been traversed may be removed by the path visualization application 112. In other embodiments, the graphical representation of the path 400 is displayed as a trail, such as by displaying portions of the graphical representation of a path 400 as the corresponding component of the graphical representation of the robotic device 230 traverses those portions.

In various embodiments, the path visualization application 112 tracks changes to the location, size, and/or orientation of the reference points during the visualization process. Accordingly, if the user moves the display device 120, 122 and/or sensor(s) 124 during the visualization process, then the path visualization application 112 modifies the locations, sizes, and/or orientations of the graphical representation of the robotic device 230, the graphical representation of the path 400, and/or the graphical indicators 420 so that these graphics are properly displayed from the perspective of the user. For example, with respect to the graphical representation of the robotic device 230, the path visualization application 112 could modify the location, size, and orientation each time the perspective view is altered so that the graphical representation of the robotic device 230 accurately represents the location, size, and orientation of the physical robotic device during a particular operation. Further, with respect to the graphical representation of the path 400, the path visualization application 112 could modify the location, size, and orientation each time the perspective view is altered so that the graphical representation of the path 400 accurately represents the path that would be traveled by a component of the robotic device during a particular operation.

Figure 5:
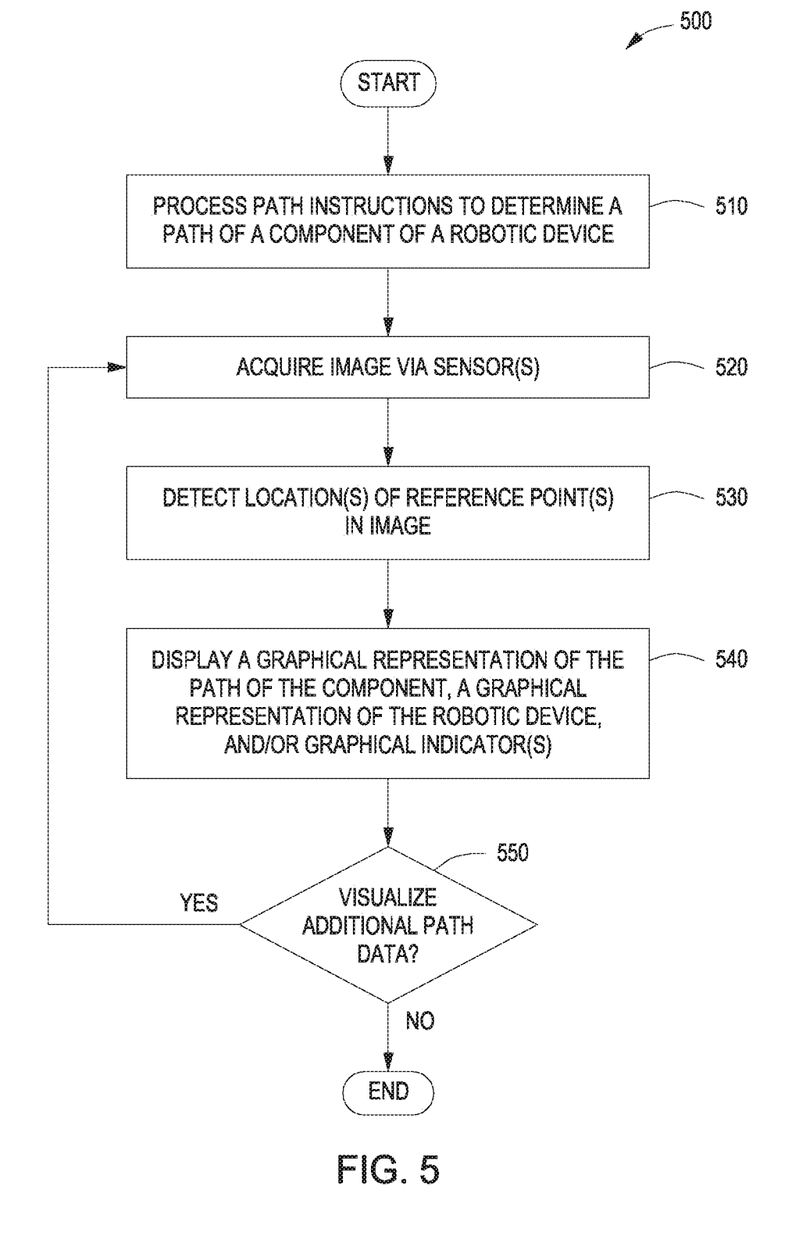
FIG. 5 is a flow diagram of method steps for displaying a virtual path associated with a robotic device, according to various embodiments of the present invention.

FIG. 5 is a flow diagram of method steps for displaying a path associated with a robotic device, according to various embodiments of the present invention. Although the method steps are described in conjunction with the systems of FIGS. 1-4C, persons skilled in the art will understand that any system configured to perform the method steps, in any order, falls within the scope of the various embodiments.

As shown, a method 500 begins at step 510, where the path visualization application 112 processes path instructions (e.g., numerical control (NC) instructions, such as G-code instructions) associated with a robotic device to determine a path of one or more components of the robotic device. In some embodiments, the path visualization application 112 processes path instructions associated with an operation to be performed by the robotic device to determine, as a function of time, the coordinates of one or more components (e.g., end effector 232, joints, arms, etc.) within a three-dimensional space.

At step 520, the path visualization application 112 acquires one or more images via the sensor(s) 124. Then, at step 530, the path visualization application 112 detects the location(s) of one or more reference points (e.g., a tracker 210) included in the image(s). At step 540, the path visualization application 112 generates one or more graphics based on the location(s) of the reference point(s) and displays the graphics via the display device 120 or the head-mounted display device 122. For example, at step 540, the path visualization application 112 could overlay the graphic(s) onto an image acquired at step 520 and/or display the graphic(s) on a translucent display (e.g., head-mounted display device 122).

In some embodiments, at step 540, the graphic(s) generated and displayed by the path visualization application 112 vary as a function of time, based on which portion of the path is currently being visualized. For example, as shown in FIG. 4A, if the beginning of the path (i.e., t=0) is being visualized, then the path visualization application 112 could generate and display the entire graphical representation of the path 400 and a graphical representation of the robotic device 230 in which the components are configured in a starting position. By contrast, if a subsequent portion of the path is being visualized (e.g., as shown in FIG. 4B), then the path visualization application 112 could generate and display a graphical representation of the robotic device 230 in which the components are configured in a different position.

Next, at step 550, the path visualization application 112 determines whether additional path data should be visualized. For example, at step 550, the path visualization application 112 could determine that additional portions of the path (e.g., the portions of the path shown in FIG. 4C) have not yet been generated and/or displayed. If the path visualization application 112 determines that additional path data should be visualized, then the method 500 returns to step 520, where one or more additional images are acquired. If the path visualization application 112 determines that additional path data should not be visualized, then the method 500 terminates.

Figure 6:
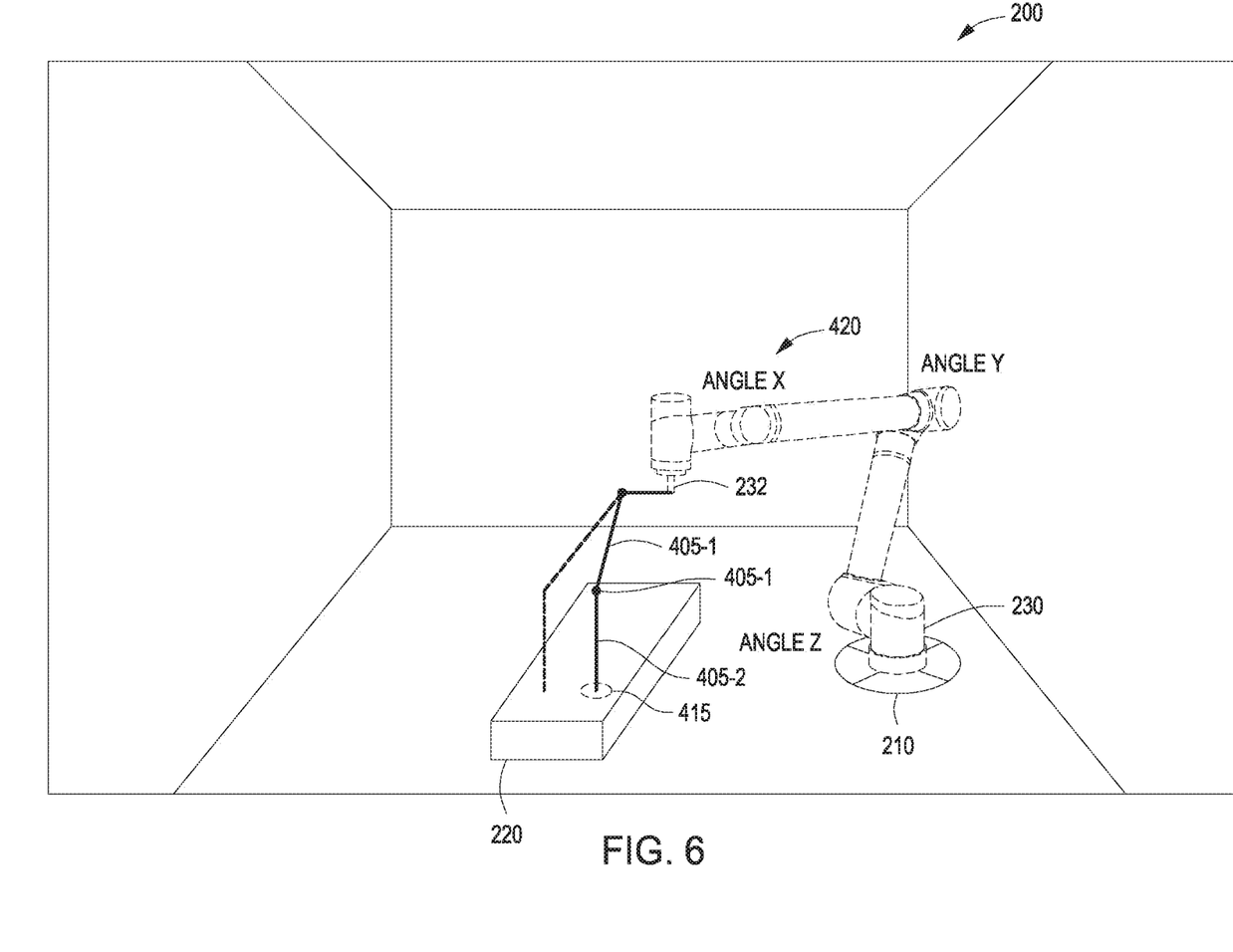
FIG. 6 illustrates a technique for modifying the path of the virtual robotic device within the work environment of FIG. 3, according to various embodiments of the present invention.

FIG. 6 illustrates a technique for modifying the path of the robotic device within the work environment of FIG. 3, according to various embodiments of the present invention. As described above, one or more control points 410 associated with a path may be interactive, enabling a user to select and move the controls points 410 with his or her hand(s) in order to modify the path to be traversed by the robotic device. For example, as shown, a user could grab control point 410-1 and move the control point 410-1 to his or her right, causing the path visualization application 112 to move path segment 405-1 and path segment 405-2 to the right and modifying the location at which the end effector 232 will contact the workpiece 220.

In other embodiments, when a user grabs control point 410-1 and moves the control point 410-1 to his or her left or right, the path visualization application 112 modifies the locations, lengths, curvatures, and/or angles of the path segments 405-1, 405-2 and control point 405-1, but does not modify the location at which the end effector 232 will contact the workpiece 220. Accordingly, in such embodiments, the path of a component of the robotic device can be modified without substantially affecting the operation being performed on the workpiece. Additionally, in various embodiments, the user is able to grab and modify one or more path segments 405 in order to modify the path of a component of the robotic device. Further, in some embodiments, the user is able to grab and modify components of the graphical representation of the robotic device 230 in order to modify the locations and/or angles of the components when performing an operation.

Figure 7:
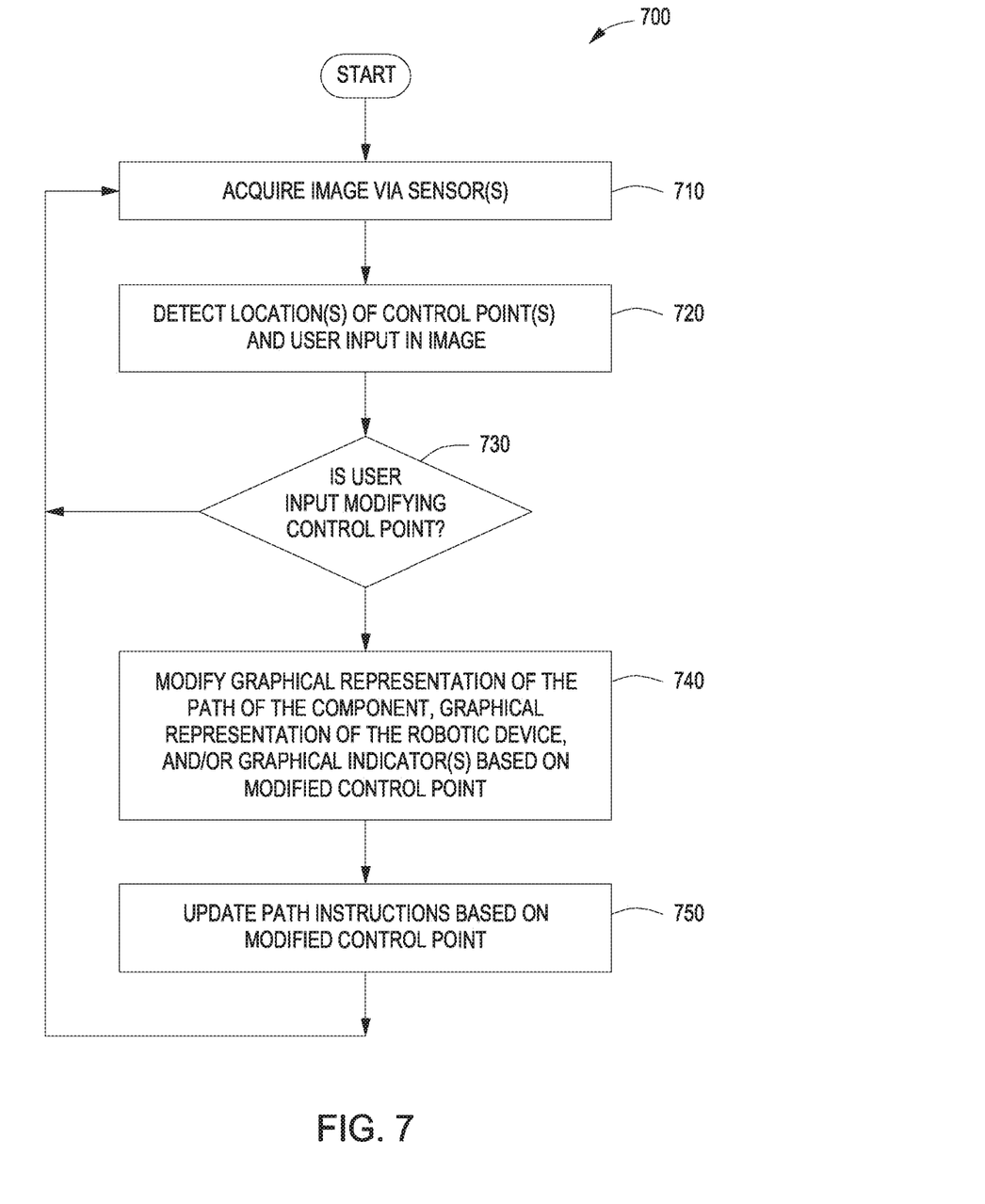
FIG. 7 is a flow diagram of method steps for modifying a virtual path of a robotic device via user input, according to various embodiments of the present invention.

FIG. 7 is a flow diagram of method steps for modifying a path of a robotic device via user input, according to various embodiments of the present invention. Although the method steps are described in conjunction with the systems of FIGS. 1-6, persons skilled in the art will understand that any system configured to perform the method steps, in any order, falls within the scope of the various embodiments.

As shown, a method 700 begins at step 710, where the path visualization application 112 acquires one or more images via the sensor(s) 124. At step 720, the path visualization application 112 detects the location(s) of one or more control points 410 and user input within the image. Next, at step 730, the path visualization application 112 determines whether the user input is modifying a control point. For example, at step 720, the path visualization application 112 could detect the locations of the user's fingers and, at step 730, determine whether the user has performed a gesture (e.g., a grasping gesture, pushing gesture, or pulling gesture) proximate to one or more of the control points 410.

If the path visualization application 112 determines that the user input is not modifying a control point 410, then the method 700 returns to step 710. If the path visualization application 112 determines that the user input is modifying a control point 410, then the method 700 proceeds to step 740, where the path visualization application 112 modifies the graphical representation of the path 400, the graphical representation of the robotic device 230, and/or the graphical indicator(s) 420 based on the modified control point. Then, at step 750, the path visualization application 112 updates the path instructions based on the modified control point. The method 700 then returns to step 710.

Although the above technique for modifying a path of a component of a robotic device via user input is described with respect to control points 410, the technique could also be performed on path segments 405 and/or components of the graphical representation of the robotic device 230, such as the end effector 232, joints, arms, etc. For example, at step 720, the path visualization application 112 could detect user input proximate to the path segments 405, the end effector 232, joints, arms, etc. Then, at step 730, the path visualization application 112 could determine whether the user input is modifying the locations of the path segments 405, end effector 232, joints, arms, etc. At step 740, the path visualization application 112 would then modify the graphical representation of the path 400, the graphical representation of the robotic device 230, and/or the graphical indicator(s) 420 and, at step 750, update the path instructions based on the modifications. Additionally, the path visualization application 112 could detect other types of user input, such as user input for toggling between different inverse kinematics states, input for adjusting joint accelerations, etc.

In sum, the path visualization application processes path instructions to generate a path of one or more components of a robotic device. The path visualization application then analyzes an image to detect one or more reference points within the image. Next, the path visualization application displays a graphical representation of the path of the component of the robotic device, a graphical representation of the robotic device, and/or one or more graphical indicators that provide information about the robotic device.

At least one advantage of the techniques described herein is that a three-dimensional representation of the path of a robotic device can be viewed within the operating environment of the robotic device, allowing potential collisions to be detected, before such collisions take place. Additionally, the path of the robotic device can be modified via user input within the operating environment itself, and updates to the path can be immediately viewed, for example, via an augmented reality display. Accordingly, robotic devices can be more safely and efficiently implemented in a variety of processes. Further, detailed information about robot components (e.g., joint angles) can be viewed, enabling a user to make more informed decisions when planning complicated movements of a robot.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. One or more non-transitory computer-readable media including instructions that, when executed by one or more processors, configure the one or more processors to perform the steps of:
   processing path instructions that comprise coded instructions and specify an operation to be performed by a robotic device;
   detecting at least one reference point within a first image of a workspace;
   generating a representative path associated with the robotic device based on the processed path instructions and the at least one reference point,
   wherein generating the representative path comprises:
      detecting the at least one reference point within a second image of the workspace;
      determining that the at least one reference point has moved from a first location to a second location; and
      modifying the representative path based on the second location; and
   displaying, via a visualization application, the representative path within the workspace.

2. The one or more non-transitory computer-readable media of claim 1, wherein generating the representative path further comprises at least one of translating the representative path based on a location of the at least one reference point, or rotating the representative path based on an orientation of the at least one reference point.

3. The one or more non-transitory computer-readable media of claim 1, wherein displaying the representative path comprises overlaying, via a head-mounted display device, the representative path on a live view of the workspace.

4. The one or more non-transitory computer-readable media of claim 1, wherein displaying the representative path comprises overlaying the representative path on substantially real-time images of the workspace acquired via an image sensor.

5. The one or more non-transitory computer-readable media of claim 1, wherein the representative path comprises a path associated with an end effector of the robotic device.

6. The one or more non-transitory computer-readable media of claim 1, wherein the representative path comprises an animated three-dimensional representation of the robotic device.

7. The one or more non-transitory computer-readable media of claim 1, wherein the representative path comprises volumetric boundaries occupied by the robotic device while traveling along the representative path.

8. The one or more non-transitory computer-readable media of claim 1, further comprising displaying, proximate to the representative path, a graphical indicator that includes at least one of an angle, a speed, and an acceleration associated with a joint of the robotic device.

9. The one or more non-transitory computer-readable media of claim 1, wherein modifying the representative path comprises:
modifying at least one of a size, an orientation, and a location of the representative path based on the second location.

10. The one or more non-transitory computer-readable media of claim 1, further comprising:
detecting user input within the second image of the workspace proximate to at least one point on the representative path;
modifying at least one of the path instructions based on the user input; and
updating the representative path based on the at least one path instruction.

11. A method for displaying a representative path associated with a robotic device, the method comprising:
processing path instructions that comprise coded instructions and specify an operation to be performed by a robotic device;
detecting at least one reference point within a first image of a workspace;
generating the representative path based on the processed path instructions and the at least one reference point, wherein generating the representative path comprises:
detecting the at least one reference point within a second image of the workspace;
determining that the at least one reference point has moved from a first location to a second location; and
modifying the representative path based on the second location; and
displaying, via a visualization application, the representative path within the workspace.

12. The method of claim 11, wherein generating the representative path further comprises at least one of translating the representative path based on a location of the at least one reference point, or rotating the representative path based on an orientation of the at least one reference point.

13. The method of claim 11, wherein displaying the representative path comprises at least one of overlaying, via a head-mounted display device, the representative path on a live view of the workspace and overlaying the representative path on substantially real-time images of the workspace acquired via an image sensor.

14. The method of claim 11, wherein the representative path comprises a path associated with an end effector of the robotic device.

15. The method of claim 11, wherein the representative path comprises an animated three-dimensional representation of the robotic device.

16. The method of claim 11, wherein the representative path comprises volumetric boundaries occupied by the robotic device while traveling along the representative path.

17. The method of claim 11, further comprising displaying, proximate to the representative path, a graphical indicator that includes at least one of an angle, a speed, and an acceleration associated with a joint of the robotic device.

18. The method of claim 11, wherein modifying the representative path comprises:
modifying at least one of a size, an orientation, and a location of the representative path based on the second location.

19. The method of claim 11, further comprising:
detecting user input within the second image of the workspace proximate to at least one point on the representative path;
modifying at least one of the path instructions based on the user input; and
updating the representative path based on the at least one path instruction.

20. A system for displaying a representative path associated with a robotic device, the system comprising:
a memory storing a path visualization application;
a processor that is coupled to the memory and, when executing the path visualization application, is configured to:
process path instructions that comprise coded instructions and specify an operation to be performed by a robotic device;
detect at least one reference point within a first image of a workspace; and
generate the representative path based on the processed path instructions and the at least one reference point, wherein generating the representative path comprises:
detecting the at least one reference point within a second image of the workspace;
determining that the at least one reference point has moved from a first location to a second location; and
modifying the representative path based on the second location; and
a display coupled to the processor and configured to display the representative path within the workspace.

21. The one or more non-transitory computer-readable media of claim 1, wherein generating the representative path further comprises scaling the representative path based on a size of the at least one reference point.

* * * * *